Patented May 19, 1931

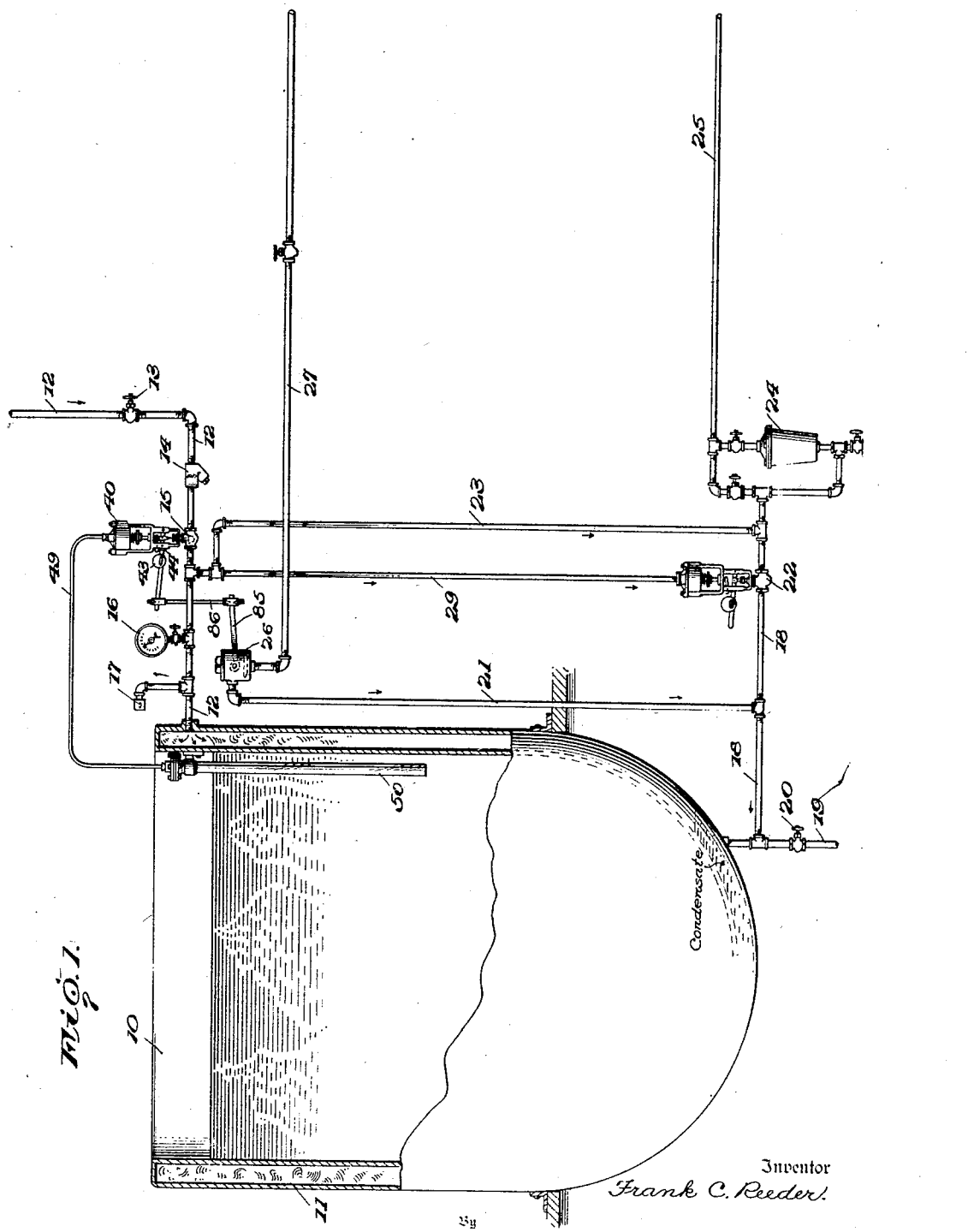

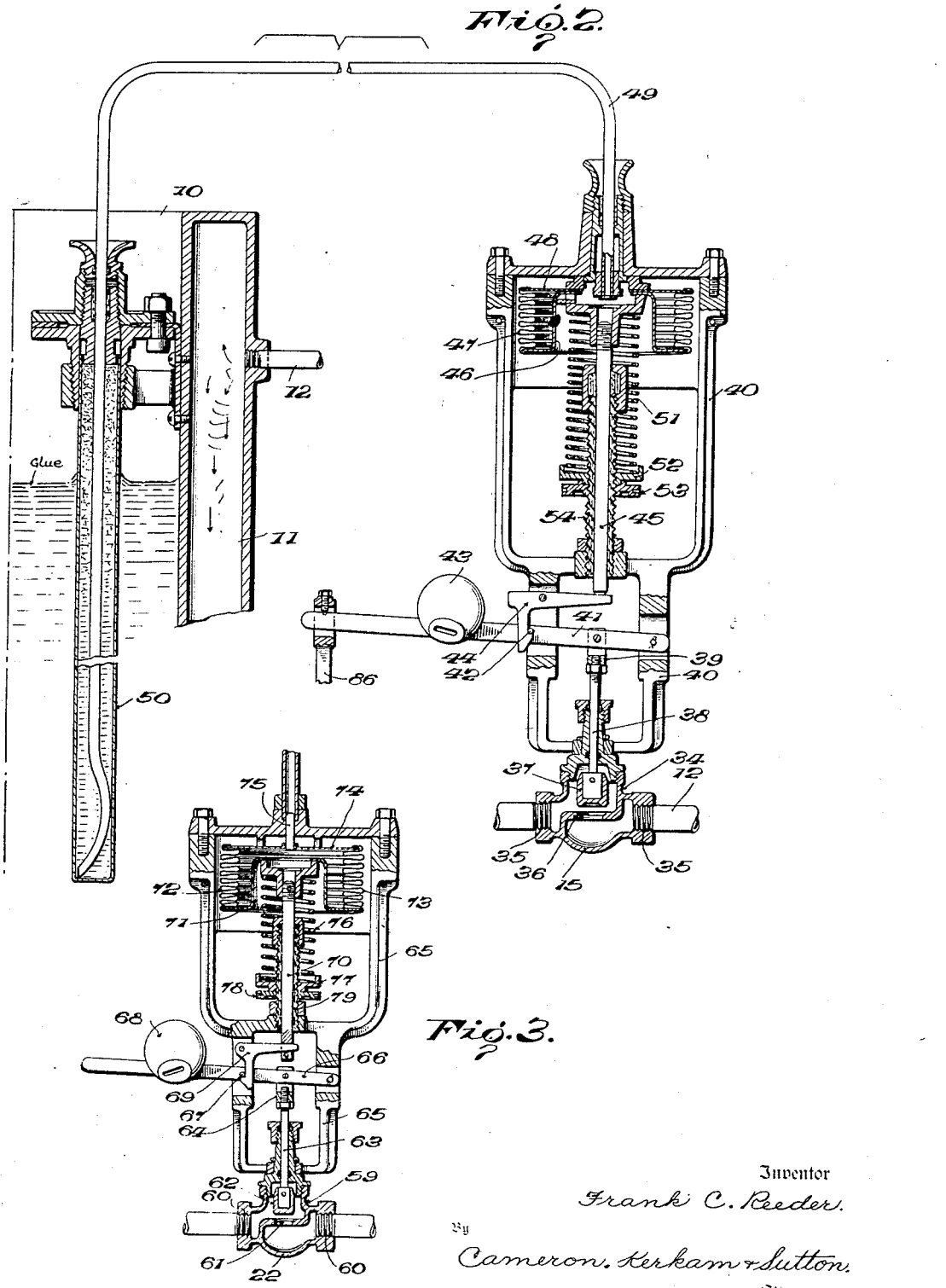

1,806,367

UNITED STATES PATENT OFFICE

FRANK C. REEDER, OF KNOXVILLE, TENNESSEE, ASSIGNOR TO THE FULTON SYLPHON COMPANY, OF KNOXVILLE, TENNESSEE, A CORPORATION OF DELAWARE

AUTOMATIC REGULATOR

Application filed July 10, 1929. Serial No. 377,243.

This invention relates to systems for heating a container to a predetermined temperature and then cooling the same, and more particularly to apparatus for automatically controlling the heating and cooling of glue kettles and the like. While the invention will hereinafter be described as embodied in a system for heating and cooling a glue kettle, it is to be expressly understood that the invention is capable of other uses where it is desired to first heat a given container to a predetermined temperature, and then cool the same.

In an automatic glue kettle it is desirable to heat the glue rapidly to a predetermined temperature, and then cool the glue quickly. To this end it has heretofore been proposed to provide a glue kettle with a jacket having steam inlet and outlet connections, and water inlet and outlet connections, and to heat the glue rapidly to the desired temperature by the admission of steam to the jacket, and then relieve the steam pressure in the jacket and admit cold water thereto. Systems of this character as heretofore proposed have included a number of valves which have required independent manipulation in order to first admit the steam, and then cut off the steam and relieve the steam pressure, and then admit the water.

It is an object of this invention to provide a device of the type characterized with automatic mechanism whereby, when the predetermined temperature has been reached, the admission of heating medium is stopped, the pressure relieved, and cooling medium admitted without the intervention of an operator.

Another object of this invention is to provide a device of the character described which can be readily controlled and operated by unskilled labor, which is relatively simple in construction and inexpensive to install, and which is efficient in operation.

Other objects will appear as the description of the invention proceeds.

The invention is capable of receiving a variety of mechanical expressions, one of which is shown more or less diagrammatically on the accompanying drawings, but it is to be expressly understood that the drawings are for purposes of illustration only and not to be construed as a definition of the limits of the invention, reference being had to the appended claims for that purpose.

Referring in detail to the drawings, wherein the same reference characters indicate corresponding parts in the several figures, Fig. 1 is a more or less diagrammatic elevation of a system embodying the present invention;

Fig. 2 is an enlarged axial section illustrating the temperature controlled valve employed in the embodiment of Fig. 1; and Fig. 3 is an enlarged axial section illustrating the pressure controlled valve employed in the embodiment of Fig. 1.

In the form shown, 10 designates a glue kettle of any suitable size, construction and material, and shown as provided with a surrounding jacket 11 for the reception of the heating and cooling mediums. Communicating with the jacket adjacent the upper extremity of the kettle is an inlet pipe 12 for any suitable heating medium, such as steam, which leads from any suitable source of steam supply. Interposed in said inlet pipe 12 is a hand-controlled valve 13, a strainer 14, a temperature controlled valve 15, a T leading to a pressure gauge 16, and a T leading to a vacuum vent valve 17 which will open to relieve the vacuum in the system.

Communicating with the jacket adjacent the bottom thereof is a pipe 18 which serves both as an outlet for the heating medium, as the steam condensate, and an inlet for the cooling medium, as water, as hereinafter explained. Pipe 18 may be provided with a drain extension 19 provided with a hand-controlled valve 20, if desired. Pipe 18 includes in its length a T connection for the water inlet pipe 21, an automatic valve 22, and a T connection for the water outlet pipe 23, and leads to a steam trap 24 of any suitable construction, shown as provided with the usual by-pass and shut-off valves so that the lines may be drained and the sediment removed therefrom, said traps communicating with a waste or return line 25.

The water inlet pipe 21 leads from an automatic valve 26 to be described, with which communicates the water supply pipe 27. The water outlet pipe 23 communicates at its outlet end with the pipe 18 and its opposite end is connected to a T in a pipe 29, which, at its upper end, communicates with the steam inlet pipe 12 and, at its lower end, communicates with the automatic valve 22 to be described.

Valve 15 in the steam line 12 is designed to be closed automatically when the glue within the kettle 10 has reached a predetermined temperature, say 165° F. for example. To this end any suitable mechanism may be provided for closing the valve 15 when the desired temperature has been reached. The mechanism employed in the embodiment illustrated is shown in detail in Fig. 2. As here shown, the valve, which may be of any suitable construction, includes a housing 34 provided with suitable inlet and outlet connections 35 and a valve seat 36. Valve member 37 is connected to a stem 38 which extends outwardly through the bonnet and gland and carries a yoke 39. Suitably mounted on the valve housing 35 is a frame 40 to which is pivoted a lever 41 that is also received within the yoke 39 and suitably pivoted thereto. Lever 41 carries a latch pin 42 and the outer end of said lever may be provided with a suitable spring or, as shown, a weight 43, whereby the lever 41 is normally urged in a direction to close the valve member 37. Also pivoted on the frame 40 is a latch 44 which may engage with the latch pin 42 and lock the lever 41 in its position in which the valve member 37 is held open.

Cooperating with the latch 44 is a plunger rod 45 which has its opposite end operatively connected to or associated with the movable end wall 46 of an expansible and collapsible chamber 47, shown as having its lateral wall composed of a deeply-corrugated highly-flexible tubular wall, preferably of resilient metal, and suitably secured to the movable end wall 46 and a stationary end wall 48, as by brazing or soldering. The stationary end wall 48 of said expansible and collapsible chamber 47 is attached to the frame 40 in any suitable way, and leading through said stationary end wall is a pipe 49, which may be rigid or flexible, which communicates with a bulb 50 of any suitable construction and mounted within the glue kettle in any suitable way. As shown, said pipe 49 is extended into the bulb 50 into adjacency with the lower extremity thereof so as to provide a trap for the vapor within said bulb, as explained more in detail in Fulton Patent No. 1,102,035. The expansible and collapsible chamber 47 and pipe 49 are filled with a volatile liquid which also partially fills the bulb 50, leaving a vapor space within the latter above the surface of the liquid. Upon rise of temperature the vapor pressure in the bulb 50 increases and forces some of the volatile liquid from said bulb through the pipe 49 into the chamber 47, to expand the latter. To determine the temperature at which said chamber shall expand, suitable means are provided for opposing expansion of said chamber until the pressure has reached a predetermined amount. In the form shown, a coil spring 51 has one end cooperating with the movable end wall 46 of said chamber and its opposite end abutting against an adjustable plate 52 which is engaged by a nut 53 on the threaded guide tube 54, so that the tension of the spring 51 may be adjusted, and therefore the pressure that must exist to expand said chamber 47, and the temperature corresponding to such pressure, may be predetermined.

The bulb 50 being mounted as shown, so that it extends into and is subjected to the temperature of the glue within the kettle, when the temperature of the glue has reached the desired degree, the vapor pressure within the bulb 50 acts to expand the chamber 47, in the manner heretofore described, forcing the plunger rod 45 downwardly to move the latch 44 in a clockwise direction about its pivot, and thereby releasing the lever 41, which drops under the action of the weight 43 and closes the valve member 37, to discontinue the admission of steam.

The valve 22 interposed in the line 18 is to remain open as long as steam is admitted to the kettle jacket, so that the condensate may escape, but when the admission of steam is discontinued, and a cooling medium, as water, is to be admitted, the valve 22 closes so that the water admitted to the line 18 will be forced to flow through the jacket of the kettle. To this end valve 22 is of any suitable construction so that it will remain open as long as steam is admitted to the kettle but will close automatically as soon as the admission of steam is discontinued. The valve employed in the embodiment illustrated is shown in detail in Fig. 3, where said valve comprises a housing 59 having suitable inlet and outlet connections 60 and a valve seat 61. The valve member 62 is carried by a stem 63 which extends outwardly through the bonnet and gland to a yoke 64. Suitably mounted on the valve housing 59 is a frame 65 in which is pivoted a lever 66 that is received in the yoke 64 and suitably pivoted thereto. Lever 66 also carries a latch pin 67, and cooperating with the outer end thereof may be a spring or, as shown, a weight 68 which normally urges said lever in the direction to close the valve member 62. Pivotally mounted in the frame 65 is a latch 69 with which cooperates a plunger rod 70 having its opposite end suitably attached to the movable end wall 71 of an expansible and collapsible chamber 72, shown as having its lateral wall composed of a deeply corrugated, highly-flexible tubular wall 73, preferably of resilient metal, and suitably attached at its opposite ends to said movable end wall 71 and a stationary end wall 74, as by soldering or brazing. Said stationary end wall 74 is suitably fixed in the frame 65 and extending through said stationary end wall 74 is a pipe 75 which leads from the lower end of the pipe 29 heretofore described. Cooperating with the movable end wall 71 of the expansible and collapsible chamber 72 is a coil spring 76 which abuts against an adjustable plate 77 which is engaged by a nut 78 on the threaded guide tube 79. Coil spring 76 normally urges the expansible and collapsible chamber 72 toward collapsed condition. As long as steam pressure is maintained on the line 29, however, said chamber 72 is expanded and the plunger rod 70 permits the latch 69 to remain in the position shown in Fig. 3. When the steam inlet valve 15 is closed and the pressure is taken off of the line 29, the chamber 72 is collapsed by the coil spring 66, raising the plunger rod 70, and causing the latch 69 to move around its pivot in an anticlockwise direction, whereupon the lever 66 drops under the action of its weight 68 to close the valve member 62 and thereby shut off direct communication between the water inlet pipe 21 and the waste or return pipe 25.

Means are also provided whereby, when the steam valve 15 is closed, the automatic valve 26 in the water inlet line 21 is automatically opened. Valve 26 may be of any suitable construction, being shown as a conventional flush valve of the type which permits water to flow therethrough as long as the controlling lever is depressed. To open said valve 26 when the valve 15 is closed the lever 85 of the flush valve is suitably connected, as by a link 86, with the lever 41 of the steam valve 15. A check valve may also be interposed in the pipe 21 to prevent the steam pressure backing up into the flush valve 26.

In operation the operator opens the valves 15 and 22 by raising the levers 41 and 66 until their latch pins 42 and 67 respectively are engaged with the latches 44 and 69 respectively, and said valves are thereby latched in open position. Steam is therefore admitted to the system through the valve 15 from the pipe 12 and the steam pressure also flows into line 29 filling the expansible and collapsible chamber 72, to hold the latter expanded. At this time the expansible and collapsible chamber 47 is contracted because the vapor pressure in the bulb 50 is low, in conformity with the temperature of the glue. The condensate of the steam flows from the jacket 11 through the pipe 18 and valve 22 to the steam trap 24, and thence to the waste or return line 25. This condition maintains until the glue has reached the temperature desired, the heating of the glue being relatively rapid because of the use in the surrounding jacket of steam of suitable temperature and pressure. When the desired temperature is reached, the vapor pressure in the bulb 50 causes the expansible and collapsible chamber 47 to expand and trip the latch 44, permitting the lever 41 to fall under the influence of the weight 43. This not only closes the steam valve 15 but simultaneously opens the flush valve 26, and by reason of the loss of pressure in the line 29 the expansible and collapsible chamber 72 is collapsed by the spring 76, actuating the latch 69 and permitting lever 66 to close the valve 22. Not only is the pressure thus automatically relieved in the system but cooling water is at once admitted to the pipe 21 and flows through the pipe 18 into the jacket 11, where the glue is rapidly cooled to the desired temperature, the water flowing upwardly through the jacket 11 and out through the steam inlet pipe 12, and the water outlet pipe 23 to the waste pipe or return line.

It will, therefore, be perceived that as soon as the desired temperature is reached in the kettle the admission of steam is automatically cut off, the pressure in the system relieved and cooling water admitted to the kettle, and the valves will remain in the position then assumed, with the inlet and outlet valves 15 and 22 respectively closed and the flush valve 26 open, until the operator again latches the levers 41 and 66 in open position.

Therefore, the operation of the system is automatic, assuring that while the glue shall be rapidly heated it shall not be overheated, and further assuring that the glue shall be rapidly cooled as soon as it has reached the desired temperature. Furthermore, the apparatus provided is one that can be readily controlled and operated by unskilled labor, as an operator is only required to latch the two valve levers in open position when the batch to be heated has been placed in the kettle, and thereafter no further supervision or control by hand is required, since the heating of the glue will be discontinued, and the glue rapidly cooled, as soon as the glue has been brought to the predetermined temperature. The apparatus is also simple in construction, inexpensive to install, and highly efficient in operation.

While the embodiment of the invention illustrated on the drawings has been described with considerable particularity, it is to be expressly understood that the invention is not restricted thereto, as the same is capable of receiving a variety of mechanical expressions, some of which will now readily suggest themselves to those skilled in the art, while changes may be made in the details of construction, arrangement and proportion of parts without departing from the spirit of this invention. While particular forms of temperature controlled and pressure controlled valves have been illustrated and described, it is to be expressly understood that the invention is not restricted to the use of the particular constructions illustrated, as it is within the contemplation of this invention to use any suitable temperature controlled valve for terminating the admission of heating medium and any suitable automatic valve for simultaneously closing the outlet line, and any suitable automatically operated valve can be employed for admitting the cooling medium when the admission of heating medium is terminated. Reference is therefore to be had to the claims hereto appended for a definition of the limits of the invention.

What is claimed is:

1. In a device of the character described, in combination with a container, a jacket therefor and connections leading to and from said jacket and communicating with sources of heating and cooling medium, a valve controlling the admission of heating medium, a valve controlling the admission of cooling medium, a thermostat for operating said first named valve, and connections including a movable member between said valves whereby said second named valve is opened and said first named valve is closed by the movement of said member.

2. In a device of the character described, in combination with a container, a jacket therefor and connections leading to and from said jacket and communicating with sources of heating and cooling medium, a valve controlling the admission of heating medium, a valve controlling the escape of the heating medium, a valve for controlling the admission of cooling medium, and temperature controlled means for operating said valves simultaneously.

3. In a device of the character described, in combination with a container, a jacket therefor and connections leading to and from said jacket and communicating with sources of heating and cooling medium, a valve controlling the admission of heating medium, a valve for controlling the escape of heating medium, a valve for controlling the admission of cooling medium, connections between said first and third valves whereby said third valve is opened when said first valve is closed, and means whereby said second valve is automatically closed when said first valve is closed.

4. In a device of the character described, in combination with a container, a jacket therefor and connections leading to and from said jacket and communicating with sources of heating and cooling medium, a valve controlling the admission of heating medium, a valve controlling the admission of cooling medium, connections between said valves whereby said second valve is automatically opened when said first valve is closed, an outlet valve, and means whereby said outlet valve is automatically closed when said first valve is closed.

5. In a device of the character described, in combination with a container, a jacket therefor and connections leading to and from said jacket and communicating with sources of heating and cooling medium, a valve controlling the admission of heating medium, a valve controlling the admission of cooling medium, connections between said valves whereby said second valve is opened when said first valve is closed, an outlet valve, and means controlled by the pressure in said jacket for closing the last named valve.

6. In a device of the character described, in combination with a container, a jacket therefor and connections leading to and from said jacket and communicating with sources of heating and cooling medium, a valve controlling the admission of heating medium, a valve controlling the admission of cooling medium, connections between said valves whereby said second valve is opened when said first valve is closed, an outlet valve, means operatively connected to said outlet valve whereby said valve is held open as long as said heating medium is admitted to the system and a thermostat for determining the operation of said valves.

7. In a device of the character described, in combination with a container, a jacket therefor and connections leading to and from said jacket and communicating with sources of heating and cooling medium, a valve for admitting heating medium, a valve for admitting cooling medium, connections between said valves whereby said second valve is opened when said first valve is closed, a thermostat for operating said first valve, an outlet valve, and means for closing said outlet valve when said heating medium ceases to flow.

8. In a device of the character described, in combination with a container, a jacket therefor and connections leading to and from said jacket and communicating with sources of heating and cooling medium, a valve for admitting heating medium, a valve for admitting cooling medium, connections between said valves whereby said second valve is opened when said first valve is closed, a themostat for operating said first valve, an outlet valve, and means controlled by the pressure of the heating medium for closing said outlet valve.

9. In a device of the character described, in combination with a container, a jacket therefor and connections leading to and from said jacket and communicating with sources of heating and cooling medium, a valve for admitting heating medium, a valve for admitting cooling medium, connections between said valves whereby said second valve is opened when said first valve is closed, a thermostat for operating said first valve, an outlet valve, a pipe subjected to the pressure of the heating medium when said first named valve is open, and means associated with said pipe and said outlet valve whereby said outlet valve is closed when the pressure of the heating medium is taken off of said pipe.

10. In a device of the character described, in combination with a container, a jacket therefor and connections leading to and from said jacket and communicating with sources of heating and cooling medium, a valve for admitting heating medium, means for latching said valve in open position, a thermostat for releasing said valve, a valve for controlling the admission of cooling medium, and connections between said valves for opening said last named valve by the closure of said first named valve.

11. In a device of the character described, in combination with a container, a jacket therefor and connections leading to and from said jacket and communicating with sources of heating and cooling medium, a valve for admitting heating medium, means for latching said valve in open position, a thermostat for releasing said valve, a valve for controlling the admission of cooling medium, connections between said valves for opening said last named valve when said first named valve is closed, an outlet valve, means for latching said outlet valve in open position, and means whereby said outlet valve is released when said first named valve is closed.

12. In a device of the character described, in combination with a container, a jacket therefor and connections leading to and from said jacket and communicating with sources of heating and cooling medium, a valve controlling the admission of heating medium, means including a latch for holding said valve open, an expansible and collapsible chamber operatively connected to said latch for releasing said valve, means whereby said chamber is expanded when the temperature in said container reaches a predetermined degree, a valve for controlling the admission of cooling medium, and connections between said valves whereby said last named valve is opened by the closure of said first named valve.

13. In a device of the character described, in combination with a container, a jacket therefor and connections leading to and from said jacket and communicating with sources of heating and cooling medium, a valve controlling the admission of heating medium, means including a latch for holding said valve open, an expansible and collapsible chamber operatively connected to said latch for releasing said valve, means whereby said chamber is expanded when the temperature in said container reaches a predetermined degree, a valve controlling the admission of cooling medium, connections between said valves whereby said last named valve is opened when said first named valve is closed, an outlet valve, and connections between said first named valve and said outlet valve whereby said outlet valve is closed when said first named valve is closed.

14. In a device of the character described, in combination with a container, a jacket therefor and connections leading to and from said jacket and communicating with sources of heating and cooling medium, a valve controlling the admission of heating medium, means including a latch for holding said valve open, an expansible and collapsible chamber operatively connected to said latch for releasing said valve, means whereby said chamber is expanded when the temperature in said container reaches a predetermined degree, a valve for controlling the admission of cooling medium, connections between said valves whereby said last named valve is opened when said first named valve is closed, an outlet valve, means including a latch for holding said outlet valve open, an expansible and collapsible vessel for releasing said latch, and means whereby said last named vessel is subjected to the pressure in the system when said first named valve is open.

15. In a device of the character described, in combination with a container, a jacket therefor and connections leading to and from said jacket and communicating with sources of heating and cooling medium, a valve controlling the admission of heating medium, a valve controlling the admission of cooling medium, automatic means for closing said first valve and opening said second valve, said cooling medium flowing through said jacket in the opposite direction to said heating medium and leaving the jacket through the steam inlet connections and means for automatically closing said steam outlet connections when said second named valve is open.

16. In a device of the character described, in combination with a container, a jacket therefor and connections leading to and from said jacket and communicating with sources of heating and cooling medium, a valve controlling the admission of heating medium, a valve controlling the admission of cooling medium, automatic means for closing said first valve and opening said second valve, an outlet valve, and automatic means for closing said outlet valve when said first named valve is closed.

17. In a device of the character described, the combination of a container, a jacket therefor, connections to said jacket from sources of heating and cooling medium, and providing outflow of the cooling medium through the inlet for the heating medium, means for admitting heating medium to said jacket, means for admitting cooling medium to said jacket, temperature controlled means whereby the admission of heating medium is stopped and the admission of cooling medium is initiated when the temperature in said container reaches a predetermined degree, and means for automatically preventing escape of the cooling medium through the outlet connection for the heating medium.

18. In a device of the character described, in combination with a container, a jacket therefor and connections leading to and from said jacket and communicating with sources of heating and cooling medium, means for admitting heating medium to said jacket, means for admitting cooling medium to said jacket, temperature controlled means whereby the admission of heating medium is stopped and the admission of cooling medium is initiated when the temperature in said container reaches a predetermined degree, said cooling medium flowing from the jacket through the inlet for the heating medium, and means for closing the outlet for the heating medium when the admission of heating medium is terminated.

19. In a device of the character described, in combination with a container, a jacket therefor and connections leading to and from said jacket and communicating with sources of heating and cooling medium, means for admitting heating medium to said jacket, means for admitting cooling medium to said jacket to flow therethrough in the opposite direction from said heating medium, temperature controlled means whereby the admission of heating medium is stopped and the admission of cooling medium is initiated when the temperature in said container reaches a predetermined degree, an outlet valve for the heating medium, and means for closing said outlet valve when the pressure of the heating medium is taken off of the jacket.

In testimony whereof I have signed this specification.

FRANK C. REEDER.